(12) United States Patent
Shiozawa et al.

(10) Patent No.: US 6,742,093 B2
(45) Date of Patent: May 25, 2004

(54) SUBSYSTEM AND METHOD OF REORGANIZING MULTIPLEXED DATA

(75) Inventors: Hitoshi Shiozawa, Odawara (JP); Koji Ozawa, Naka-gun (JP); Takahisa Kimura, Odawara (JP); Kazuhito Suishu, Odawara (JP); Kosaku Kambayashi, Odawara (JP); Katsunori Nakamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/348,783

(22) Filed: Jan. 23, 2003

(65) Prior Publication Data

US 2003/0110362 A1 Jun. 12, 2003

Related U.S. Application Data

(63) Continuation of application No. 09/982,935, filed on Oct. 22, 2001, now Pat. No. 6,615,328, which is a continuation of application No. 09/256,859, filed on Feb. 24, 1999, now abandoned.

(30) Foreign Application Priority Data

Feb. 26, 1998 (JP) .......................................... 10-045380

(51) Int. Cl.[7] .......................... G06F 12/00; G06F 12/16
(52) U.S. Cl. .......................... 711/162; 711/161; 714/6; 707/204; 710/260
(58) Field of Search .................................. 711/161, 162, 711/4; 714/6; 710/260; 707/204

(56) References Cited

U.S. PATENT DOCUMENTS

| | | | | |
|---|---|---|---|---|
| 5,692,155 A | * | 11/1997 | Iskiyan et al. | 711/162 |
| 5,845,328 A | * | 12/1998 | Maya et al. | 711/162 |
| 5,875,479 A | * | 2/1999 | Blount et al. | 711/162 |
| 6,044,444 A | * | 3/2000 | Ofek | 711/162 |
| 6,131,148 A | * | 10/2000 | West et al. | 711/162 |
| 6,317,815 B1 | * | 11/2001 | Mayer et al. | 711/165 |

* cited by examiner

*Primary Examiner*—Manlo Padmanabhan
*Assistant Examiner*—Jasmine Song
(74) *Attorney, Agent, or Firm*—Kenyon & Kenyon

(57) ABSTRACT

Disk units operable under control of different disk control units hold the same data. Under circumstances in which data is duplexed, when data is duplexed again after data that is generally saved as backup data was accessed for reading and writing, in order to efficiently duplex data, update places of both original data and sub-data updated during the duplexing of data is interrupted are registered on an access information management table of an original disk control unit. When the original disk control unit receives a duplexing resume command, the duplexing of data may be efficiently reorganized by copying original data corresponding to an access place produced during the duplexing is interrupted from information of the access information management table to the backup data or by copying the backup data to the original data.

20 Claims, 7 Drawing Sheets

FIG. 3

| ABBREVIATION OF STATES | CONTENTS |
|---|---|
| STATE 1 | DURING DUPLEXING (DURING ORIGINAL AND SUB DATA ARE COINCIDENT) |
| STATE 2 | DURING INTERRUPTION OF DUPLEXING (ONLY DATA OF ORIGINAL SIDE IS UPDATED) |
| STATE 3 | WRITE ACCESS ON SUBSIDE DURING INTERRUPTION OF DUPLEXING |

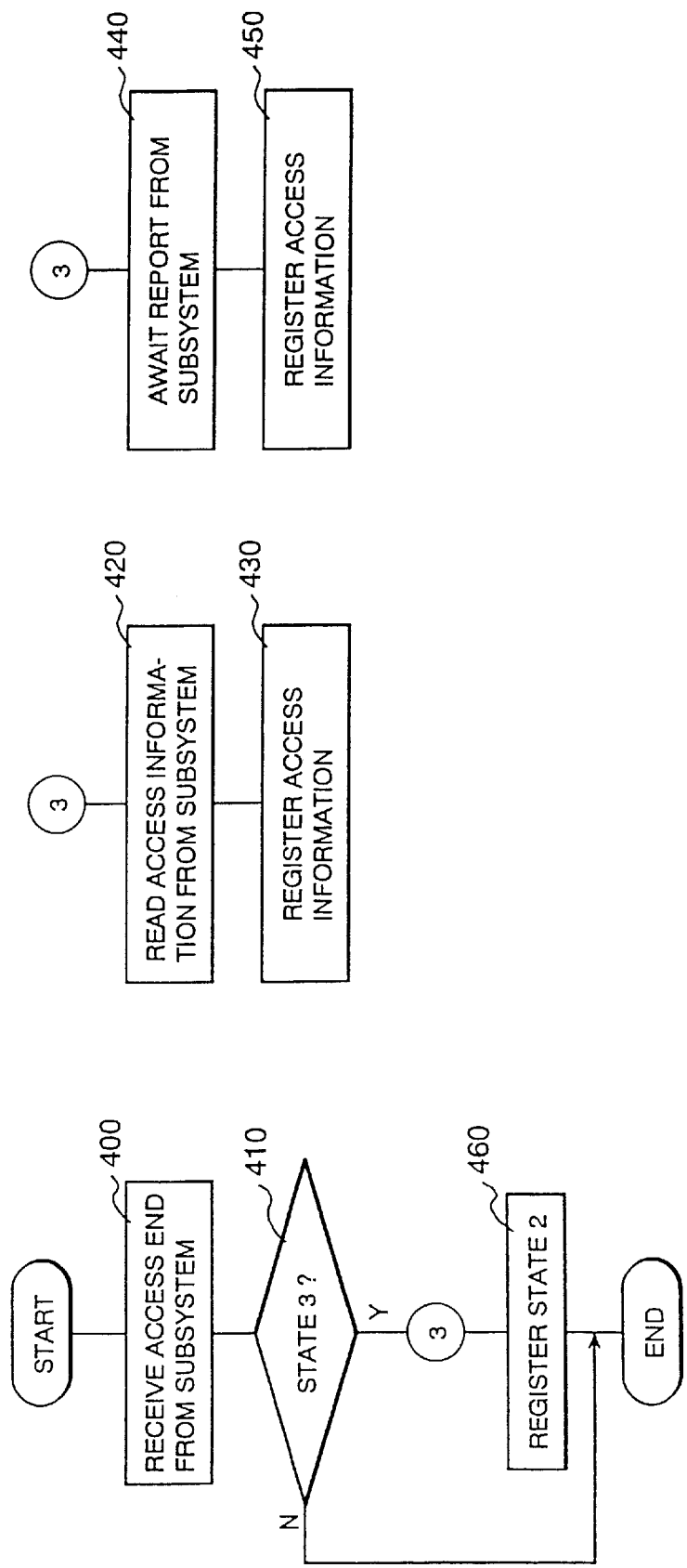

SUBSYSTEM AND METHOD OF REORGANIZING MULTIPLEXED DATA

This is a continuation of application Ser. No. 09/982,935 filed Oct. 22, 2001 now U.S. Pat. No. 6,615,328, which is a continuation of application Ser. No. 09/256,859 filed Feb. 24, 1999 now abandoned.

BACKGROUND OF THE INVENTION

The present invention relates to a multiplexed data memory system in which an external memory control unit which receives a write command from a host unit and which memorizes the received write command in an external memory unit under its control as original data writes the same data as that original data in the external memory unit operable under different external memory control units as backup data. More particularly, the present invention relates to a multiplexed data reorganizing system capable of effectively utilizing backup data and which is also able to efficiently reorganize the duplexing of original data obtained after backup data was used and the backup data, and relates to a subsystem for carrying out this system.

In a multiplexed data memory system in which data used in a host unit such as a host computer is multiplexed and held by a plurality of external memory units, e.g. original external memory unit and sub-external memory unit, as a method of holding the multiplexing of data between the original external memory unit and the sub-external memory unit, there are generally known technologies disclosed in Japanese Published Unexamined Patent Application No. Hei 6-214853, Japanese Published Unexamined Patent Application No. Hei 7-6099, Japanese Patent No. 2509460 and Japanese Translation of PCT Application No. Hei 8-509565. According to the method disclosed in the above-mentioned technologies, an original external memory unit and sub-external memory unit are provided under control of different external memory control units, the original external memory control unit and the sub-external memory control unit are connected via an interface cable and a write command received at the original-side external memory control unit is issued to the sub-side external memory control unit, thereby resulting in the multiplexing of data of the original external memory unit and the sub-external memory unit being maintained.

In such multiplexed data memory system, as a method of reorganizing the multiplexing after the multiplexing is interrupted, there is known a method of copying only an update place of an original external memory unit which is interrupted in multiplexing to a sub-side external memory unit, i.e. so-called difference copy.

In this difference copy, data of the sub-side external memory unit is generally used as backup data of the original-side external memory unit. During data is duplexed, a write access and a read access are generally inhibited from a standpoint of coincidence of original data and sub-data.

SUMMARY OF THE INVENTION

Recently, although a demand of effectively utilizing backup data increases from a standpoint of increasing an efficiency of a business, an inefficient procedure should be unavoidably made in order to reorganize the multiplexing after the access on the backup data was ended.

When backup data is temporarily used as test program data by utilizing the duplexed data memory system, for example, or when backup data of data of a certain time point is obtained from a sub-side external memory unit and saved in other memory medium, further when a trouble occurs the sub-side external memory unit and when the sub-side external memory unit is accessed in order to execute a program for restoring such trouble, if the duplexing of data should be released and the duplexing of data should be formed again, then all data of the original-side external memory unit should be copied to the sub-side external memory unit.

However, in this case, when a difference of several tracks at most occurs in the original-side and sub-side data due to the access on the sub-side external memory unit, according to the above-mentioned method of reorganizing the multiplexed data, there is then the problem that an efficiency of re-arrangement is not excellent.

Also, when a business is temporarily shifted to the sub-side system, the duplexed state of data should be released. When the business is again returned to the original-side system, the old sub-side system is provisionally set in the original-side system and the old original-side system is provisionally set in the sub-side system thereby duplexing the data. Further, the duplexed state is released, the provisional sub-side system is returned to the original system, the provisional original-side system is returned to the subsystem and the business is resumed in the inherent original-side system. Such a complex procedure should be executed.

That is, in the conventional multiplexed data memory system, the multiplexed state should be released in order to access the backup data. When the multiplexing is reorganized after the accessing was ended, an inefficient procedure requiring the initialization should be executed.

A problem of the present invention is that, under circumstances in which the multiplexing of data is organized, after read and write accessing was made on data generally saved as backup data, the multiplexing of data may be reorganized efficiently.

A fundamental feature of the present invention lies in that, under circumstances in which the multiplexing of data is organized, after read and write accessing was made on data generally saved as backup data, when the multiplexing of data is organized again, the multiplexing may be reorganized efficiently by copying only the update places obtained by the access from the original system to the subsystem or from the subsystem to the original system.

A feature of the multiplexed data processing system according to the present invention has a function to issue an original disk control unit write command to the sub-disk control unit which controls the backup data in the multiplexed data memory system in which disk units which are under control of different disk control units have the same data.

Thus, update places of original and sub data updated during data is multiplexed are registered on the access information management table of the original disk control unit as access information. When the original disk control unit receives a duplexing resume command, it becomes possible to efficiently reorganize the duplexing by copying original data corresponding to the access place occurred in the duplexing interruption from the information of the access information management table to the backup data or copying the backup data to the original data.

Also, a feature of the multiplexed data processing system according to the present invention is that it has a function to register access places on the access information management table.

The duplexing re-arrangement in the duplexed data memory system according to the present invention and its action will be described concretely as follows.

Initially, each time the write access occurs in the backup data obtained during the duplexing is interrupted in the channel command analyzing section of the subsystem, the access place is registered on the access information management table.

Then, when the channel command analyzing section receives an access end command relative to the backup data, the channel command analyzing section reports it to the original system. The original system reads out information from the access information management table of the subsystem, merges the read-out information to the access information of the original system and registers the merged information on the access information management table.

When the channel command analyzing section of the original system receives the duplexing resume command, the access information management table is checked, and a write command or a read command of data of the access place is issued to the subsystem, thereby reorganizing the duplexing.

The feature of the present invention will be described more in detail. The present invention is a subsystem comprising means for recognizing whether or not the access of the original side external memory control unit on the subside external memory unit is started or ended and means for judging which data of the original-side and sub-side external memory control units should be used as original data when the duplexing of data is reorganized after the backup data was updated and wherein the original-side and sub-side external memory control units include means for recognizing the access situation of the backup data.

BRIEF DESCRIPTION OF THE DRAWINGS

FIG. 3 is a table showing a correspondence between the state contents registered on a state management table and their abbreviations;

FIG. 6A is a flowchart showing a flow of a processing executed by the original disk control unit until access information of the sub-disk unit is obtained after the access end report relative to the sub-disk unit was received; and FIG. 6B is an example of an access information registration processing ③ of FIG. 6A;

FIG. 6C is another example of an access information registration processing ③ of FIG. 6A;

DESCRIPTION OF THE PREFERRED EMBODIMENT

An embodiment in which the present invention is applied to the duplexed data memory system will be described below.

Figure 1:
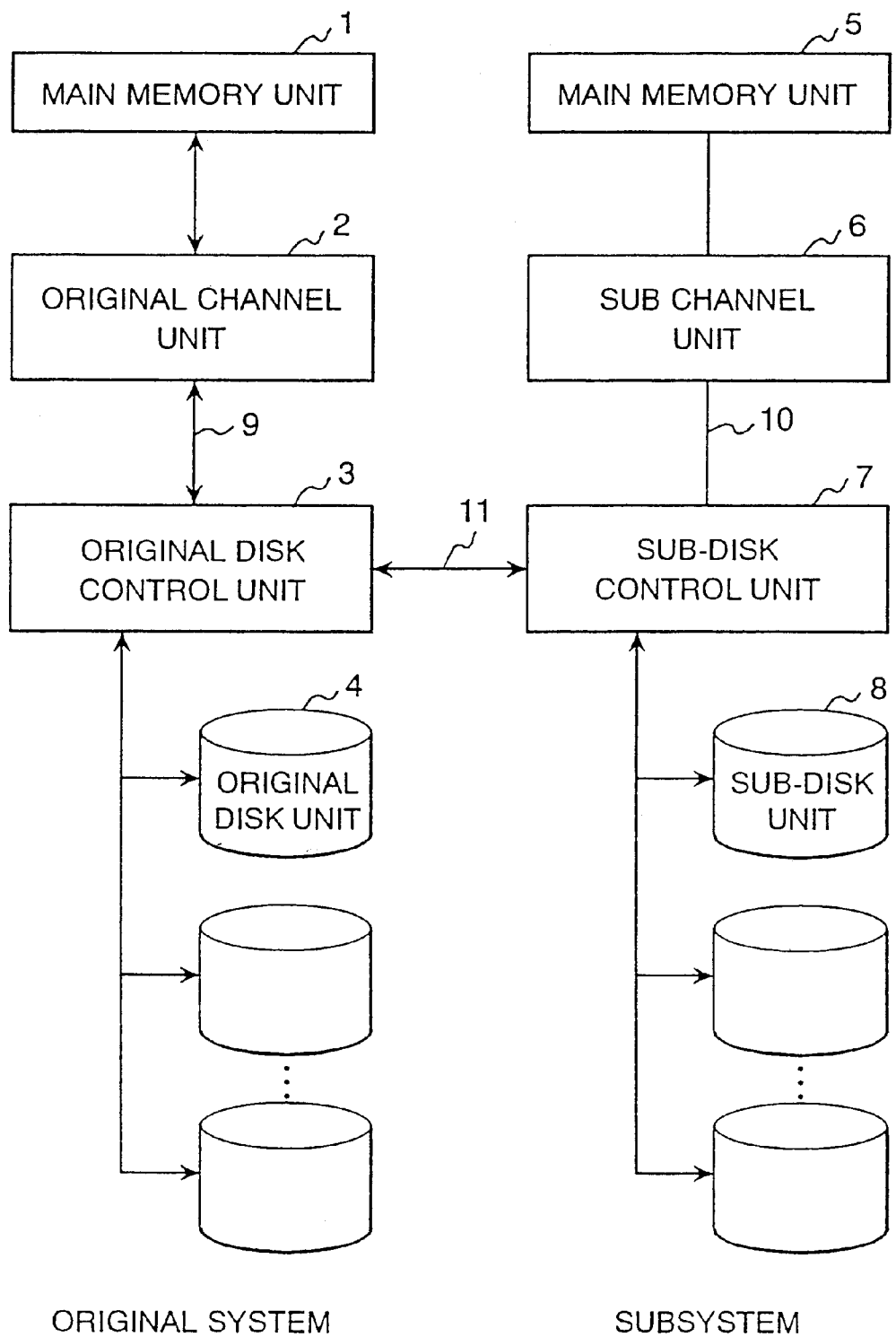
FIG. 1 is a block diagram showing a data processing system according to an embodiment of the present invention.

FIG. 1 of the accompanying drawings is a block diagram showing a duplexed data memory system according to an embodiment of the present invention. As shown in FIG. 1, this duplexed data memory system comprises an original system composed of a main memory unit 1, a original channel unit 2, an original disk control unit 3 serving as an external memory control unit and an original disk unit 4 serving as an external memory unit and a subsystem composed of a main memory unit 5, a subchannel unit 6, a subdisk control unit 7 and a subdisk unit 8 similarly to this original system. The original channel unit 2 and the original disk control unit 3; and the subchannel unit 6 and the subdisk control unit 7 are connected together by interface cables 9 and 10. Also, the original disk control unit 3 and the subdisk control unit 7 are connected by an interface cable 11.

Incidentally, the main memory unit 1 and the original channel unit 2 are connected to a part of a host unit (not shown) or the host unit.

Figure 2:
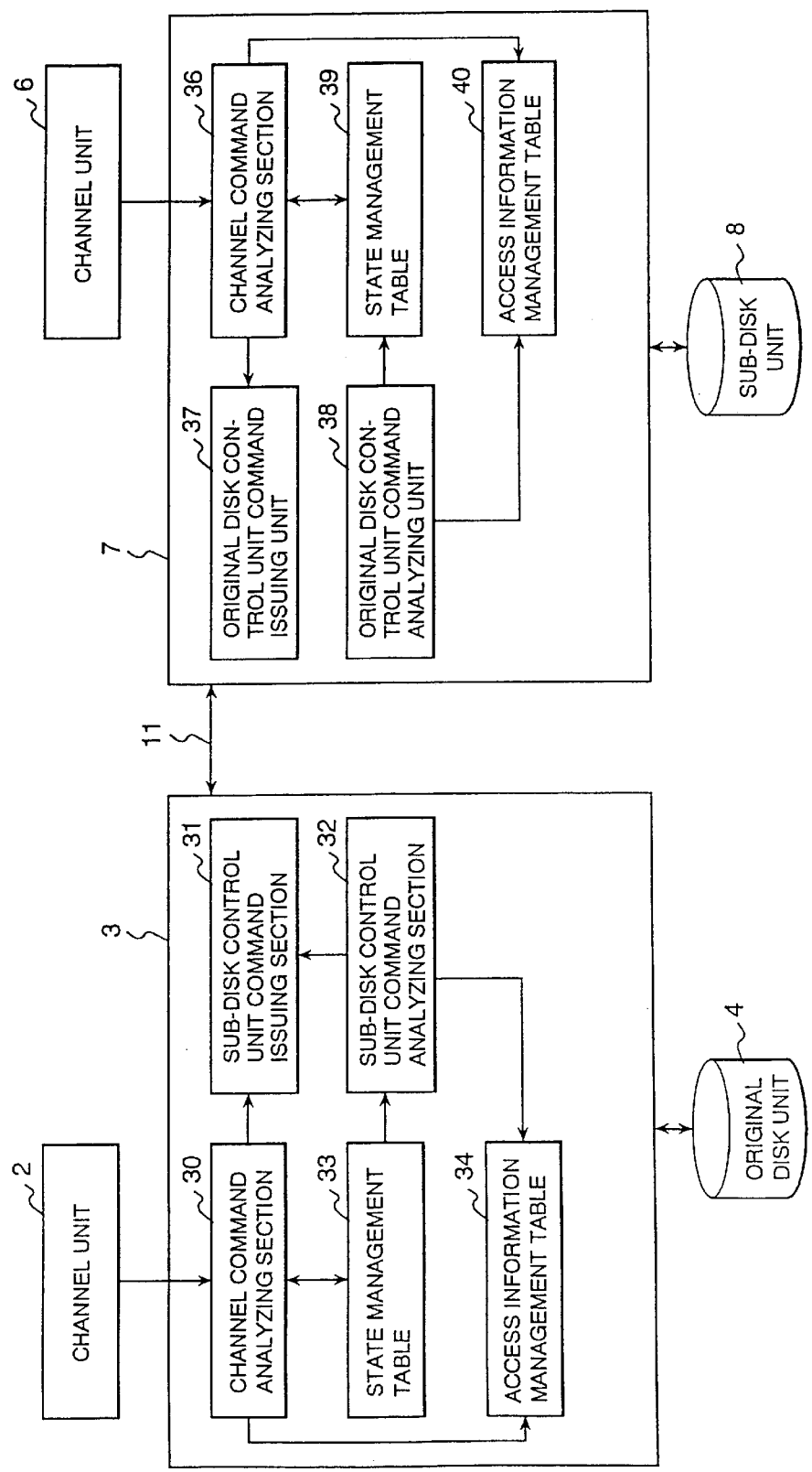
FIG. 2 is a block diagram showing inside arrangements of original and sub-disk control units in FIG. 1.

FIG. 2 shows the internal arrangements of the original disk control unit 3 and the subdisk control unit 7.

As shown in FIG. 2, the original disk control unit 3 includes a channel command analyzing section 30, a subdisk control unit command issuing section 31, a subdisk control unit command analyzing section 32, a state management table 33 for managing the state of a duplexing forming disk unit and an access information management table 34 for registering access places of original and sub-disk units obtained during the duplexing is interrupted.

Similarly, the sub-side disk control unit 7 includes a channel command analyzing section 36, an original disk control unit command issuing section 37, an original disk control unit command analyzing section 38, a state management table 39 for memorizing the same information as that of the state management table 33 of the original disk control unit and an access information table 40 for memorizing access places of the subdisk unit obtained during the duplexing is interrupted.

As disk units used as original and sub-disk units, there are generally used magnetic disks, and any disk units may be used so long as they may be used as recording media such as a magnetic tape and a DVD.

FIG. 3 shows contents registered on the state management tables 33, 39 and their abbreviations. A state 1 shows the state in which the duplexed data memory system shown in FIG. 1 is used in the duplexing circumstances and data of the original system and the subsystem are coincident with each other.

A state 2 shows the state in which the duplexed data memory system shown in FIG. 1 is interrupted in use under the duplexing circumstances and data of the original system is updated.

Further, a state 3 shows the state in which the duplexed data memory system shown in FIG. 1 is interrupted in use under the duplexed data circumstances and the write access is made on the subsystem.

The processing operation in the embodiment of the present invention will be described in accordance with the flowcharts of FIGS. 4 to 7. In FIGS. 4 to 7, "state 1", "state 2" and "state 3", shown as the states registered on the state management table are those shown in FIG. 3. The present invention shown in FIGS. 1 to 3 will be described in detail with reference to FIGS. 4 to 7.

Figure 4B:
FIG. 4B is an example of an access registration processing ① of FIG. 4A.
Figure 4C:
FIG. 4C is another example of an access registration processing ① of FIG. 4A.
Figure 4A:
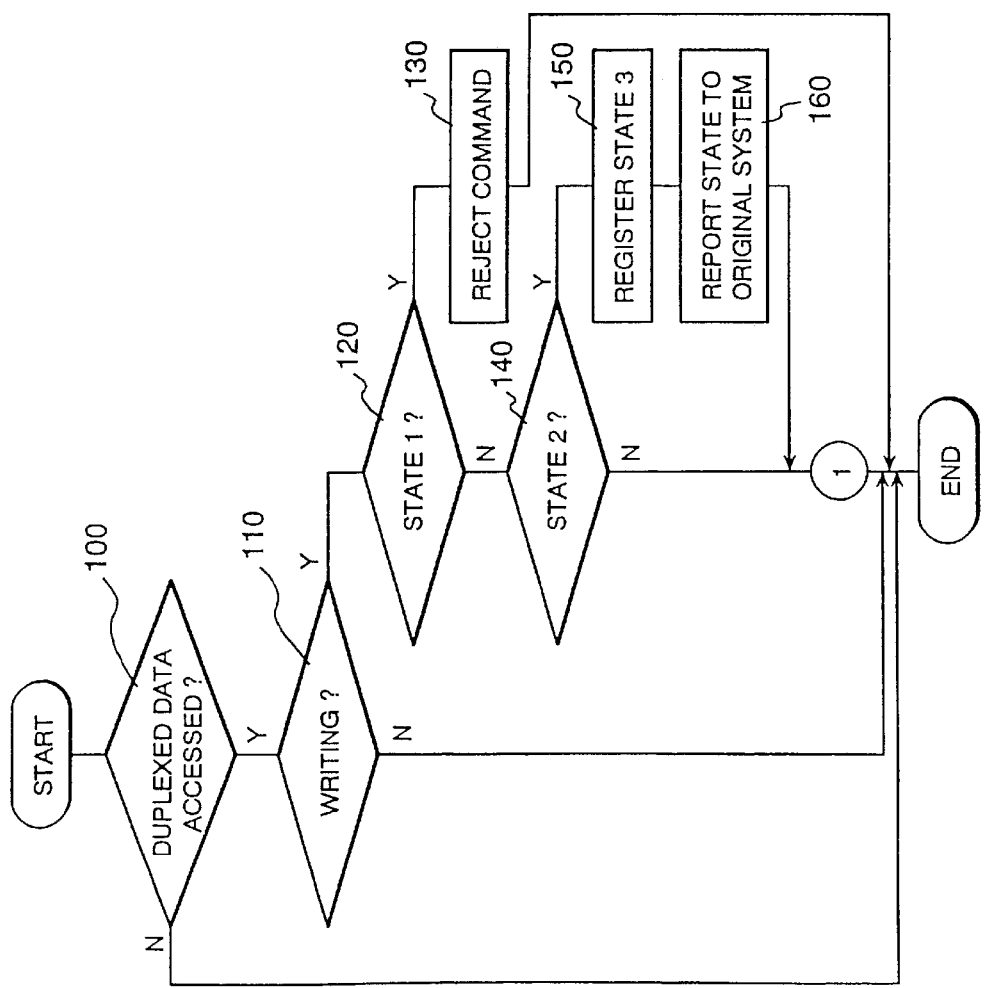
FIG. 4A is a flowchart showing a flow of a processing executed by a sub-disk control unit until a state management table is set and an access information management table is set after the access occurred in the sub-disk unit.

FIG. 4A shows a flow of processing executed in the subdisk control unit 7 until the state management table 39 is set and the access information management table 40 is set since the access occurs in the sub-disk unit 7.

In FIG. 4A, if the command received at the channel command analyzing section 36 of the sub-disk unit 7 is the access to duplexed data (step 100) and is also the write access (step 110), then the state management table 39 is checked. Then, the state is the duplexing ("state 1") (step 120), then a command of the requested write access is rejected (step 130).

If the state is the duplexing interruption ("state 2") (step 140), then the duplexing interruption write access state ("state 3") is registered on the state management table 39 (step 150), and such state is reported to the original disk control unit 3 (step 160) by a dedicated command. Also in the original disk control unit 3, the received state is similarly registered on the state management table 33.

With respect to the registration processing ① of access information on the sub-disk unit 8 in FIG. 4A, as shown in FIG. 4B, write access place information may be registered on the access information management table 40 (step 170). Alternatively, as shown in FIG. 4C, the access information may be reported to the original disk control unit 3 by a dedicated command (step 180).

When the access information registration processing shown in FIG. 4B is realized, after the access to the backup data was ended, the disk control unit for controlling original data collectively reads out update place information of backup data from the disk control unit which controls the backup data.

On the other hand, when the access information registration processing shown in FIG. 4C is realized, after the access to the backup data was ended, the disk control unit for controlling backup data collectively reports update place information of backup data to the disk control unit which controls original data.

In any cases, the original disk control unit 3 merges received access information to access information relative to the original disk unit 3, and registers merged access information on the access information management table 34.

Then, FIG. 5 shows a flow of a processing executed in the sub-disk control unit 7 until the access information is reported to the original disk control unit 3 since the access to the sub-disk unit 8 was ended.

Figure 5C:
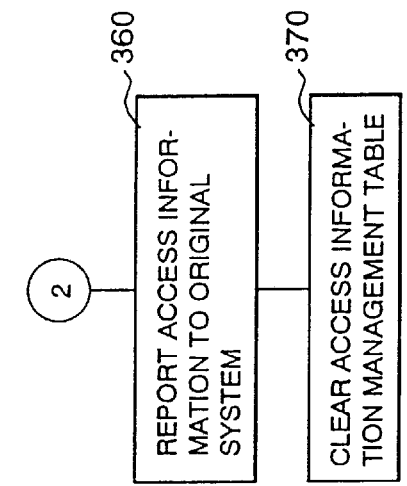
FIG. 5C is another example of an access information reporting processing ② of GIG. 5A.
Figure 5B:
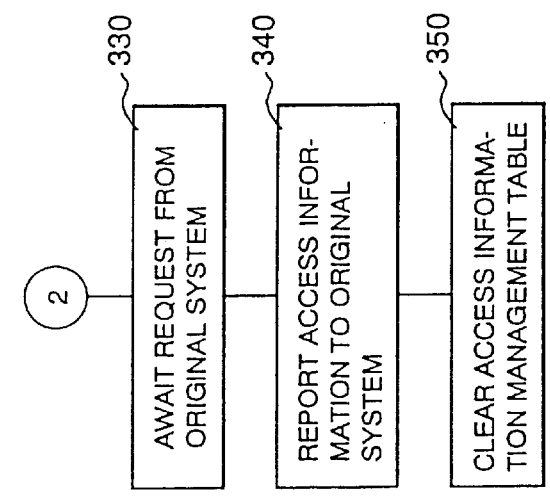
FIG. 5B is an example of an access information reporting processing ② of GIG. 5A.
Figure 5A:
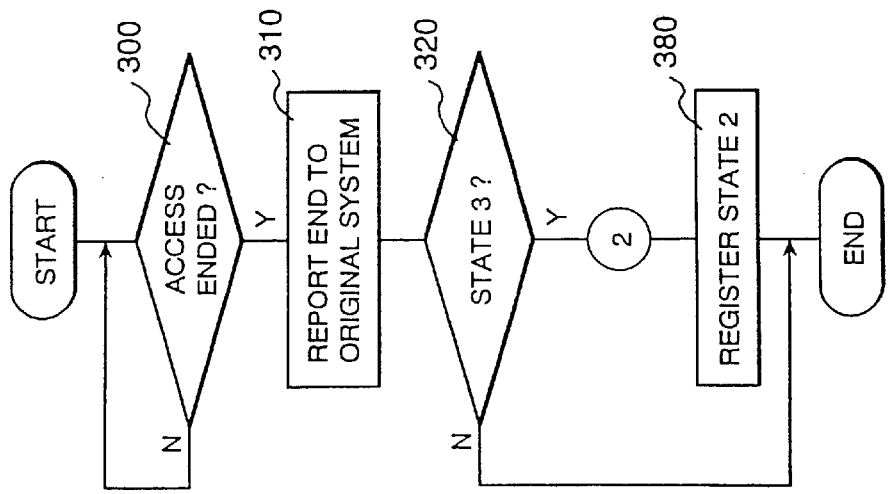
FIG. 5A is a flowchart showing a flow of a processing executed by the sub-disk control unit until access information is reported to the original disk control unit after the access to the sub-disk unit was ended.

In FIG. 5A, if a command received at the channel command analyzing section 36 of the sub-disk control unit 7 is an access end command relative to the sub-disk unit 8 which is placed in the duplexed data state (step 300), then the end of the access is reported to the positive disk control unit 3 by a dedicated command from the positive disk control unit command issuing section 37 (step 310).

Then, if the write access of the duplexing interruption is carried out with reference to the state management table 39 (step 320), then a processing ② in which the access information is reported to the original disk control unit 3 is realized by a method of FIG. 5B or FIG. 5C.

When this processing ② is realized by the method shown in FIG. 5B, the access information read request from the original disk control unit 3 is awaited (Step 330). Then, after such request is received, the access information is reported to the original disk control unit 3 by a dedicated command (step 340), and the contents of the access information management table 40 are cleared (step 350).

On the other hand, when the processing ② is realized by the method shown in FIG. 5C, the access information is reported to the original disk control unit 3 by a dedicated command (step 360), and the contents of the access information management table 40 are cleared (step 370). Thereafter, the duplexing interruption information is registered on the state management table 39 (step 380).

FIG. 6 shows a flow of a processing executed by the original disk control unit 3 until the access information of the sub-disk unit 8 is obtained after the access end report to the sub-disk unit 8 was received.

In FIG. 6A, after the access end report was received at the sub-disk control unit command analyzing section 32 of the original disk control unit 3 (step 400), the state management table 33 is checked. If the write access of the duplexing interruption is carried out (step 410), then an access information registration processing ③ may be realized by either method shown in FIG. 6B or FIG. 6C.

If the processing shown in FIG. 6B is executed, then the access information read command is issued to the sub-disk control unit 7 by a dedicated command (step 420), and the read-out information is merged to the access information relative to the original disk unit 4 and then registered on the access information management table 34 (step 430).

If the processing shown in FIG. 6C is executed, then the report of the access information from the sub-disk control unit 7 is awaited (step 440), and the received information is merged to the access information relative to the original disk unit 4 and then registered on the access information management table 34 (step 450). Thereafter, the sub-side write access information of the duplexing interruption is registered on the state management table 33 (step 460).

Further, FIG. 7 shows a flow of a processing executed in the original disk control unit 3 when the duplexing is resumed from the interruption in the embodiment.

A command in which information indicating whether data of the original disk unit 4 obtained after the duplexing is resumed is used as data of the original disk unit 4 obtained in the duplexing interruption (original data is used) or as data of the sub-disk unit 8 (sub-data is used) is added to a conventional duplexing resume command is prepared as a new duplexing resume command.

Figure 7B:
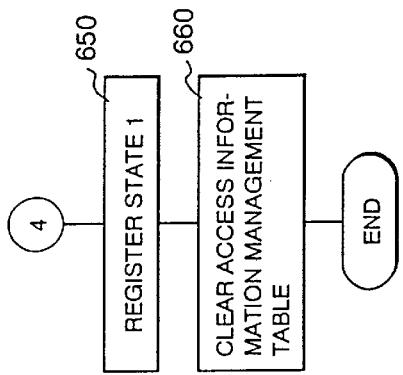
FIG. 7B is a flowchart showing the flow of a processing after the processing ④ of FIG. 7A.
Figure 7A:
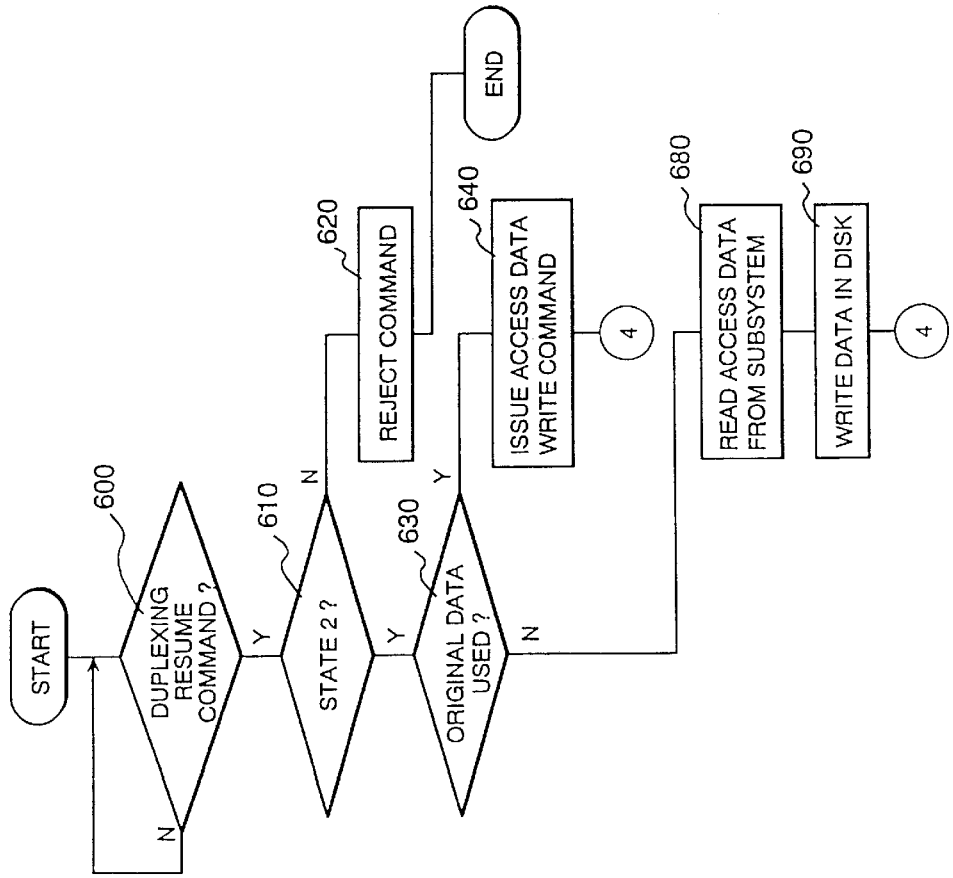
FIG. 7A is a flowchart showing a flow of a processing executed in the original disk control unit when the duplexing is resumed from its interruption.

In FIG. 7A, if it is determined by the channel command analyzing section 30 of the original disk control unit 3 that the command from the original channel unit 2 is the duplexing resume command (step 600), then the state management table 33 is checked. Then, if such command is placed in other states than the duplexing interruption state (step 610), then the command is rejected (step 620). If the state is the duplexing interruption state and the added information of the duplexing resume command represents original data use (step 630), then the access information management table 34 is checked, and the write command relative to the access place is issued to the sub-disk unit 8 (step 640). If the added information of the duplexing resume command does not represent the original data use (i.e. represent sub-data use) (step 630), then the access information management table 34 is checked, a read command relative to the access place is issued to the sub-disk control unit 7 (step 680), and the data thus obtained is written in the original disk unit 4 (step 690).

Following the steps 640 and 690, as shown in FIG. 7B, duplexing information is registered on the state management table 33 (step 650), and contents of the access information management table 34 are cleared (step 660). Also in the sub-disk control unit 7, after the writing of received data is ended at the step 640, or when data was reported at the step 680, duplexing information is registered on the state management table 39.

As described above, the sub-disk control unit 7 memorizes information of update place in response to the access to the backup data. After the access was ended, the original disk control unit 3 reads out such information from the sub-disk control unit 7. Alternatively, after the access was ended, the sub-disk control unit 7 reports such information to the original disk control unit 3 so that each time the access occurs in the backup data, the update place obtained by the accessing of the sub-disk unit 8 is reported to the original disk control unit 3.

As described above, according to the multiplexed data memory system of the present invention, under the circumstances comprising the original system for executing the business and the sub-system holding its backup data, resources may be effectively utilized by accessing the read and write from and on the backup data.

Also, the multiplexing of data may be efficiently reorganized by copying only the update place data from the original system disk unit to the sub-system disk unit or copying only the update place data from the sub-system disk unit to the original system disk unit after the access was ended.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A data storage device comprising:
   a channel unit coupled to a host;
   a disk control unit coupled to said channel unit for interrupting copying of data to another data storage device which corresponds to said data storage device during multiplexing, and for reading updated data stored in said another data storage device from another host during said interruption of multiplexing, and for resuming said copying of data to said another data storage device after reading said updated data; and,
   a disk unit controlled by said disk control unit for storing data read out from said another data storage device.

2. A data storage device according to claim 1, wherein said disk control unit comprises a first table for registering an updated location in said data storage device during interruption of multiplexing.

3. A data storage device according to claim 1, wherein said disk control unit reads out an updated location updated in said another data storage device from another host during interruption of multiplexing, and comprises a first table for registering said read out location.

4. A data storage device according to claim 3, wherein said disk control unit reads out said updated data updated in said another data storage device from another host during interruption of multiplexing by using information registered in said first table.

5. A data storage device according to claim 3, wherein said disk control unit judges, according to the direction of the copy resume when said host directs resume of copying to said another data storage device, to copy either updated data from said data storage device to said another data storage device or updated data from said another data storage device to said data storage device.

6. A data storage device according to claim 5, wherein said disk control unit judges, according to said direction of the copy resume, to copy said updated data from said data storage device to said another data storage device, and copies said updated data to said another data storage device.

7. A data storage device according to claim 5, wherein said disk control unit judges, according to said direction of the copy resume, to copy said updated data from said another data storage device to said data storage device, and accesses update data registered in said another data storage device.

8. A data storage device according to claim 1, wherein said another data storage device comprises a first access information management table for registering an access location accessed from another host which is connected to said another data storage device, and said disk control unit comprises a read command issuing section for reading the information of said access location registered in said first access information management table from said another data storage device.

9. A data storage device according to claim 8, wherein said disk control unit comprises a second access information management table for registering an access location accessed from said host to said disk unit during said interruption of multiplexing, and registers merged information of said read out access location with information of said access location registered in said second access information management table to said second access information management table, and read out data from said another data storing device based on said merged and registered information.

10. A data storage device according to claim 1, wherein said another data storing device comprises a first access information management table for registering an access location accessed from another host to said another data storing device during said interruption of multiplexing, and said disk control unit comprises a command receiving section for receiving information of said access location registered in said first access information management table.

11. A data storage device according to claim 10, wherein said disk control unit comprises a second access information management table for registering an access location accessed from said host to said data storing device during said interruption of multiplexing, and registers merged information of said access location received by said command receiving section with information of said access location registered in said second access information management table to said second access information management table, and reads out data from said another data storing device based on said merged and registered information.

12. A data storage device comprising:
   a disk control unit for controlling writing or reading of data transmitted from a host, and for interrupting copying of data to another data storage device corresponding to said data storage device during multiplexing, and for reading out updated data updated in said another data storage device from another host during said interruption of multiplexing, and for resuming said copying of data to said another data storage device after reading said updated data, and
   a disk unit controlled by said disk control unit for storing data read out from said another data storing device.

13. A data storage device according to claim 12, wherein said disk control unit comprises a first table for registering an updated location in said data storage device during interruption of multiplexing.

14. A data storage device according to claim 12, wherein said disk control unit reads out an updated location updated in said another data storage device from another host during interruption of multiplexing, and comprises a first table for registering said read out location.

15. A data storage device according to claim 14, wherein said disk control unit reads out said updated data updated in said another data storage device from another host during interruption of multiplexing by using information registered in said first table.

16. A data storage device according to claim 12, wherein said disk control unit judges, according to the direction of the copy resume when said host directs resume of copying, to copy either updated data from said data storage device to said another data storage device or updated data from said another data storage device to said data storage device.

17. A data storage device according to claim 12, wherein said disk control unit judges, according to said direction of the copy resume when said host directs resume of copying, to copy said updated data from said data storage device to said another data storage device, and copies said updated data to said another data storage device.

18. A data storage device according to claim 12, wherein said another data storage device comprises a first access information management table for registering an access location accessed from another host which is connected to said another data storage device, and said disk control unit comprises a read command issuing section for reading the information of said access location registered in said first access information management table from said another data storage device.

19. A data storage device according to claim 18, wherein said disk control unit comprises a second access information management table for registering an access location accessed from said host to said disk unit during said interruption of multiplexing, and registers merged information of said read out access location with information of said access location registered in said second access information management table to said second access information management table, and read out data from said another data storing device based on said merged and registered information.

20. A data storage device according to claim 12, wherein said disk control unit judges, according to said direction of the copy resume, to copy said updated data from said another data storage device to said data storage device, and accesses update data registered in said another data storage device.

* * * * *